ns

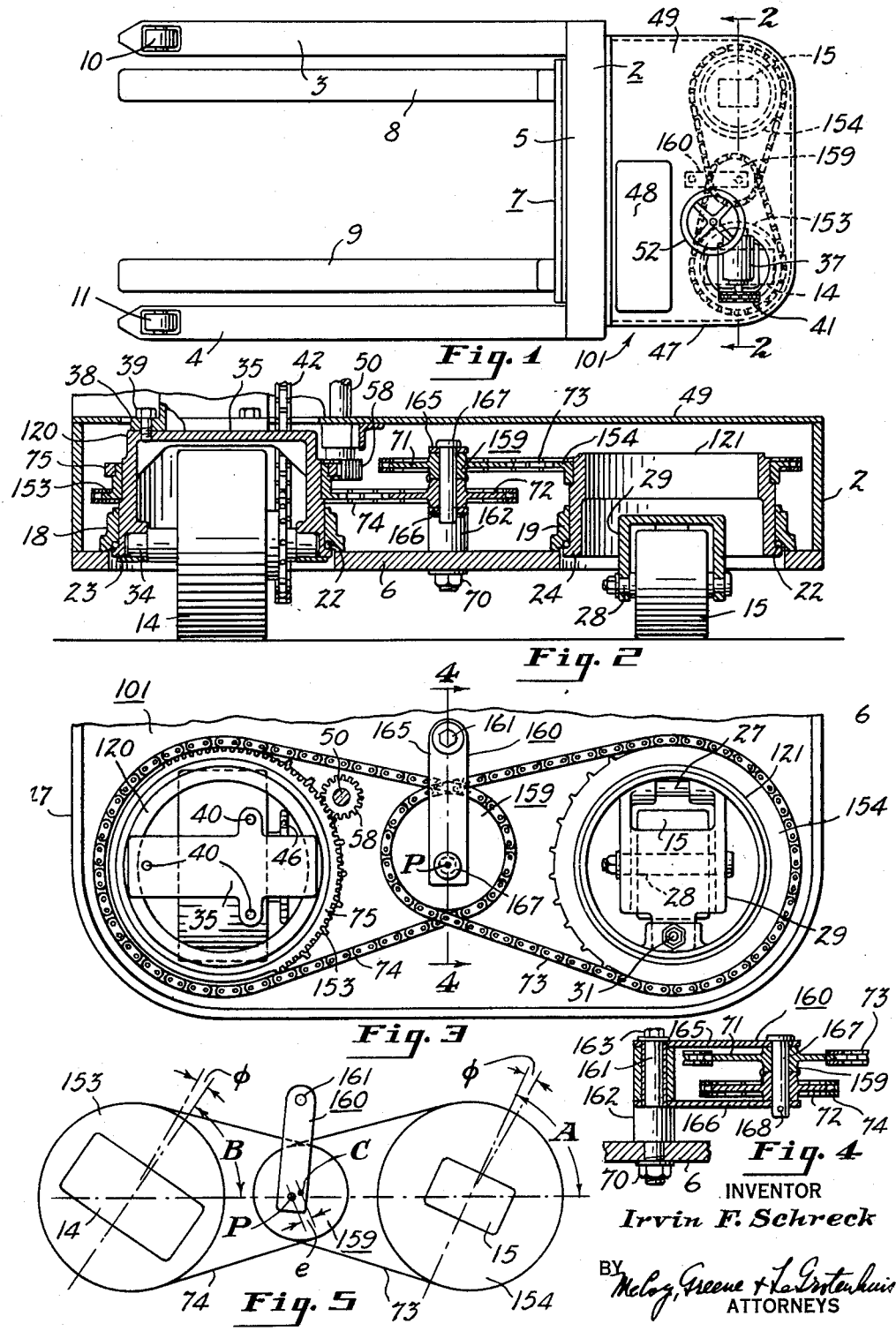

United States Patent Office 2,982,564
Patented May 2, 1961

2,982,564

CHAIN TYPE STEERING MECHANISM

Irvin F. Schreck, South Euclid, Ohio (% The Moto-Truc Co., 1953 E. 59th St., Cleveland 3, Ohio)

Filed Aug. 28, 1957, Ser. No. 680,857

1 Claim. (Cl. 280—93)

The present invention relates to a steering mechanism which positions the wheels of a vehicle at the proper angles so as to permit short radius turns with a minimum amount of lateral slip and more particularly to a steering mechanism employing chains and sprocket wheels to effect proper positioning of the steering wheels of the vehicle.

Heretofore automotive type two-wheel steering mechanisms have been unsatisfactory for industrial trucks since they caused excessive slippage and wear on the tires during short radius turns. It has been customary, therefore, to employ a caster wheel and a steered wheel at one end of a truck which must make turns approaching 90 degrees.

The present invention provides a simple and inexpensive two-wheel steering mechanism which provides a close approximation to a theoretically correct steering action throughout 90 degree turns to minimize wear on the tires.

According to the present invention, a steering mechanism is provided having a pair of main sprocket wheels or the like operably connected to the swiveled wheels of the vehicle to steer the same. The swiveled wheel nearest the center of turning of the vehicle is caused to rotate farther than the other swiveled wheel by rotating both main sprocket wheels simultaneously in the same direction while at the same time turning the sprocket wheels relative to each other through angle which is substantially a function of the sum of the angles of rotation of said sprocket wheels. The swiveled wheels of the vehicle may be turned substantially to the correct positions for any turn by providing a suitable chain-and-sprocket mechanism so that the tangent of one-half of said first mentioned angle is substantially proportional to the versine (versed sine) of the sum of the angles of rotation of said swiveled wheels from their straight-ahead positions.

The desired motion is obtained by providing a small sprocket wheel or the like that is drivingly connected to the main sprocket wheels and that is mounted for turning movement and for simultaneous linear bodily movement in a direction generally tangent to one main sprocket wheel. A chain may be connected between the periphery of said one main sprocket wheel and said small sprocket wheel to impart a turning movement to the main sprocket wheel and to cause the linear bodily movement of the small sprocket wheel in one direction to add to the turning movement of the main sprocket wheel caused by the turning of the small sprocket wheel. Driving means may also be provided between the small sprocket wheel and the other main sprocket wheel to impart a turning movement to said other wheel and to cause the linear bodily movement of the small sprocket wheel in said one direction to subtract from the turning movement of said other wheel caused by turning of the small sprocket wheel. In this way the main sprocket wheels are caused to swing from positions wherein the swiveled wheels of the vehicle are parallel in the same direction through angular distances which differ by an amount directly proportional to the linear bodily movement of the small sprocket wheel.

In order to obtain the correct steering action, the linear bodily movement of the small sprocket wheel should be a controlled harmonic motion. Such harmonic motion may be obtained, for example, by constraining movement of the small sprocket wheel so that its center moves at all times in a direction generally tangent to one main sprocket wheel while a point spaced from said center moves at all times toward or away from said main sprocket wheel in a substantially perpendicular direction. By imparting a predetermined harmonic motion of small magnitude to the center said small sprocket wheel, an incremental angle of rotation may be imparted to the main sprocket wheel that is substantially proportional to the versine of the angle of rotation of the small sprocket wheel.

An object of the present invention is to provide a simple, inexpensive steering mechanism by which the steering and supporting wheels of the vehicle may be swung through the larger angles necessary for making short turns and by which a differential movement is imparted to the steering wheels causing said wheels to travel in concentric paths in making turns so that the wheels roll without lateral slip during turning.

A further object of the invention is to provide a steering mechanism having circular elements which are spaced apart so that the swiveled wheels of the vehicle may be mounted a substantial distance apart without requiring an undue increase in the diameter of the circular elements.

Other objects, uses, and advantages of the present invention will become apparent to those skilled in the art from the following description and claims, and from the drawings in which:

Figure 1 is a top plan view on a reduced scale showing the lift truck and steering mechanism of the present invention;

Figure 2 is a fragmentary transverse vertical sectional view taken through the vertical axes of swinging movements of the steering wheels of the vehicle of Fig. 1, and on a larger scale;

Figure 3 is a fragmentary top plan view of the lift truck of Figs. 1 and 2, with parts broken away and with parts omitted, showing the steering mechanism on the same scale as Fig. 2, and in the straight-ahead position as in Figs. 1 and 2 wherein the swiveled vehicle wheels are in their parallel straight-ahead positions;

Figure 4 is a fragmentary longitudinal vertical sectional view taken substantially on the line 4—4 of Fig. 3 and on the same scale; and Figure 5 is a diagrammatic top plan view of the lift truck of Figs. 1 to 4 on a reduced scale showing the position of the parts during a turn, the horizontal axes of rotation of the swiveled vehicle wheels and the line of centers of said wheels being shown in dot-dash lines.

Referring more particularly to the drawings in which like parts are identified by the same numerals throughout the several views, Figs. 1, 2 and 3 show a four-wheel lift truck 101 which is substantially the same as the truck shown in my copending application Serial No. 506,306, filed May 5, 1955, now Patent No. 2,848,247. The truck 101 has a rigid metal frame 2 including a pair of laterally spaced, parallel, forwardly extending, supporting arms 3 and 4, a vertical guide standard 5 at the rear end of said arms and projecting upwardly therefrom, and a main supporting portion 6 extending rearwardly from said standard. A lifting platform 7 is mounted for vertical movement on the standard 5 and is provided with a pair of laterally spaced parallel arms 8 and 9 which extend forwardly from the guide standard parallel to the arms 3 and 4 and which move between the latter arms as shown in Figs. 1 and 2 to a lower position wherein their upper surfaces are below or substantially in the same place as the upper surfaces of the supporting arms 3 and 4.

A pair of small wheels 10 and 11 are mounted in coaxial relationship at the front ends of the arms 3 and 4 for rotation about a fixed horizontal axis perpendicular to the arms 3 and 4 and to the longitudinal center line of the truck. In order to provide for steering of the truck, a pair of swiveled steering and supporting wheels 14 and 15 are provided in the rear of the truck on opposite sides of the longitudinal center line, said steering wheels being in coaxial relationship when in their straight ahead positions parallel to the wheels 10 and 11. If the wheels 14 and 15 are properly positioned during a turn, their horizontal axes of rotation will intersect at the aforementioned horizontal axis of rotation of the wheels 10 and 11 as indicated in Fig. 8 of said copending application Serial No. 506,306.

A pair of rigid annular bearing members 18 and 19 are mounted on the frame portion 6 and are adapted to receive a pair of swiveled turrets or wheel supports 120 and 121. Said wheel supports are journaled in the bearing members 18 and 19 for swinging movement about laterally aligned vertical axes located in a plane perpendicular to the longitudinal center line of the truck and parallel to the horizontal axis of the front wheels 10 and 11. The wheel supports have circumferential flanges 23 and 24 which extend radially below the bearing members 18 and 19 to support the truck, ball bearings 22 being inserted between the flanges and the wheel supports to reduce friction.

The wheel support 121 supports the wheel 15 by means of a substantially U-shaped supporting member 29 which is mounted on a pivot pin 27 carried by the support 121. The wheel 15 has a horizontal shaft 28 which is mounted in aligned circular openings in the parallel side plates of the member 29. Said side plates are provided with aligned circular openings to receive the pivot pin 27 whereby the member 29 pivots about the horizontal axis of the pin 27. The generally annular wheel support 121 is provided with a vertical adjusting screw 31 which permits variation in the position of the wheel 15 to compensate for the differences in wear between the swiveled wheels 14 and 15 and to maintain the frame 2 substantially parallel to the floor. The members 29 and 31 are described in more detail in said copending application Serial No. 506,306.

The steering wheel 14 has a diameter materially greater than that of the steering wheel 15 and serves as the traction wheel to propel the vehicle. Both of these wheels have a diameter materially greater than that of the front wheels 10 and 11 and both may be provided with rubber tires. The wheel 14 has a horizontal shaft 34 with its opposite ends mounted in the annular lower portion of the wheel support 120. Said wheel support has an inverted U-shaped frame member or bridge 35 which extends over the traction wheel 14 to provide a support for an electric motor 37 which turns with the wheel support 120. The unit supporting the motor has a flanged base 38 that is rigidly connected to the horizontal upper portion of the frame member 35 by a series of bolts 39 which are screwed into the internally threaded openings 40 of the member 35.

The traction wheel 14 is driven by the electric motor 37 through chains, sprockets, and other mechanism which reduces the relatively high speed of rotation of the motor shaft to a relatively low speed of rotation of the traction wheel 14 on its shaft 34. The wheel 14 is driven through reduction gears and through chains 41 and 42 and their associated sprocket wheels, the lower sprocket wheel 46 being rigidly connected to the hub of the wheel 14 as best shown in Fig. 3. The electric motor, the gear reduction units and the traction wheel are combined into one power unit fixed to the upper part of the wheel support 120 for rotation therewith about a vertical axis and located at one side of the truck leaving ample space for the operator to ride at the other side of the truck.

As herein shown, the frame 2 has a marginal vertical wall 47 that extends from one side of the standard 5 along the sides and the rear of the truck to the other side of the standard. A battery 48 is mounted on the frame 2 at the rear of the standard 5 and with its center on the same side of the truck as the wheel support 120 to supply current to the electric motor 37. A flat horizontal riding platform 49 is mounted on the frame 2 at the top of the wall 47 and above the wheel 15, the battery 48 being spaced from the side of the truck to provide room for the operator to stand. A vertical steering post 50 is journaled for rotation on the frame and has a hand wheel 52 mounted on its upper end which may be gripped by the operator while he is standing on the platform 49 to steer the truck.

The steering mechanism of the present invention includes a pair of main sprocket wheels 120 and 121 which are rotated by turning the hand wheel 52 to steer the wheels 14 and 15. Means is provided including a chain and a pair of small sprocket wheels to cause relative rotation of the main sprocket wheels as a function of their total turning movement so as to maintain the vehicle wheels 14 and 15 substantially perpendicular to the radius of turning of the truck at all times during turning of the truck. As herein shown a pair of main sprocket rings or sprocket wheels 153 and 154 are rigidly mounted on the wheel supports 120 and 121 respectively for turning with said wheel supports about vertical axes which pass through the horizontal axes of rotation of the wheels 14 and 15.

The main sprocket wheels 153 and 154 are preferably circular members of the same radius having teeth or sprockets which extend throughout their circumference. Both wheels preferably have the same number of teeth and the same circumference.

If desired, a small sprocket wheel may be provided at the bottom of the hand wheel shaft 50 for engagement with the chain of the sprocket wheel 153 so as to effect turning of said sprocket wheel, but better results are obtained using gearing rather than sprockets. As herein shown, a gear segment 75 is rigidly mounted on the wheel support 120 for engaging the pinion gear 58 carried by the steering post 50. The post 50 may be rotated by turning the hand wheel 52 to rotate the pinion 58 in either direction to steer the truck to the right or left.

A driving connection is provided between the sprocket wheels 153 and 154 including a small circular sprocket means in the form of a composite sprocket wheel 159. The upper toothed portion of the wheel 159 provides a small sprocket wheel 71 with a diameter substantially equal to the radius of each main sprocket wheel, and the identical lower toothed portion of the wheel 159 provides a small lower sprocket wheel 72 of the same diameter, an upper chain 73 engaging the peripheries of the circular members 71 and 154, and a lower chain 74 engaging the peripheries of the circular members 72 and 153. The sprocket wheels 71 and 72 are mounted for rotation in unison and are welded together to form a single wheel 159, making it unnecessary to key them to the shaft 167.

Means are provided for imparting a controlled harmonic motion to the smaller sprocket wheel 159 along a linear path perpendicular to the line of centers of the main sprocket wheels 153 and 154 upon turning movement thereof in either direction. Due to the arrangement of the chains the linear bodily movement of the smaller sprocket wheel 159 in one direction increases the turning movement of one main sprocket wheel while at the same time reducing the turning movement of the other main sprocket wheel. The linear bodily movement of the smaller sprocket wheel 159 is controlled as a function of the sum of the angles of rotation of the swiveled wheels 14 and 15 from their straight-ahead parallel positions as shown in Figs. 1 to 3.

The desired harmonic bodily motion preferably is obtained by constraining movement of the small wheel 159, so that a point P thereon spaced a short distance from its center C is constrained to move at all times substantially along a line perpendicular to said line of centers. The means for constraining movement of the small sprocket wheel 159 may include a pivoted link having one end mounted on said small sprocket wheel to swing with respect thereto about a vertical axis through the point P and having its opposite end mounted on the frame 2 to swing with respect to the frame about a vertical axis through the perpendicular line along which the center C moves. Such a link may be relatively long so that the point P moves substantially in a straight line but for convenience usually is of a shorter length. The short link gives a very accurate steering action, however.

The linear bodily movement of the small sprocket wheel 159 during its rotation causes each steering and supporting wheel to be turned through an incremental angle $\phi$ in addition to the rotation of the steering wheel due to turning of said small sprocket wheel. Suitable means may be provided for rotating the turrets 120 and 121 relative to each other through an angle $2\phi$ as a function of the angle of rotation of the small sprocket wheel 159 so that the wheels 14 and 15 are always substantially in the proper positions for making a turn.

The chains 73 and 74 constrain the movement of the center C of the small sprocket wheel so that it moves in a straight line without the necessity of a pin and slot or other means to guide the center C. The movement of the point P is controlled by a link 160 which functions generally like the link 60 described in said copending application Serial No. 506,306, to provide the desired harmonic motion.

The link 160 is mounted at its front end on a pivot pin 161 having a vertical axis passing through the aforesaid longitudinal center line of the truck. The pin 161 has a radially enlarged lower end portion 162 rigidly connected by a nut 70 to the frame 2 and projects upwardly through the link 160, as best shown in Fig. 4. A nut 163 is provided to hold the link on the pin 161 so that the link and the sprocket wheel 159 are supported in cantilever fashion from the frame. As herein shown, the link 160 is bifurcated and has parallel horizontal arms 165 and 166 that extend above and below the sprocket wheel 159 to support the same. The rear ends of the parallel forked arms are provided with vertically aligned circular openings of a size to receive a pivot pin 167 which projects through the internal cylindrical opening in the sprocket wheel 159. The lower end of the pin 167 receives a cotter pin 168 which prevents upward movement of said pin. The axis of the pin 167 passes through the point P so that said point is the center of rotation of the sprocket wheel 159 relative to the link 160. As shown in Fig. 3 the point P is located on the transverse line of centers of the main sprocket wheels 153 and 154 and on the longitudinal center line of the truck midway between the main sprocket wheels and directly behind the center C when the rear wheels 14 and 15 are in their straight-ahead positions parallel to the front wheels 10 and 11. The eccentric $e$ of the small sprocket wheel is the distance from the point P to the point C and is usually a fraction of an inch for normal size trucks. It is seen, therefore, that the extent of linear bodily movement of the small sprocket wheel is relatively small.

The link 160 is shown herein as extending forwardly from the small sprocket wheel 159, but it will be apparent that similar results may be obtained when the link extends in the opposite direction and that a controlled harmonic motion is obtained whenever the link extends in the direction of bodily movement of the small sprocket wheel so that the point P moves in a direction perpendicular to the direction of movement of the center C.

The small sprocket wheel 159 preferably has a radius such that its angular movement is equal to or not substantially different from the sum of the angular movements of the vehicle wheels 14 and 15 from their straight-ahead positions shown in Figs. 2 and 3.

The steering mechanism of the present invention moves the two swiveled wheels 14 and 15 of the truck so that the wheel nearest the center of turning is swung faster than the other wheel, maintaining both wheels substantially at right angles to the radius of travel of the vehicle during the turning movement. The mechanism of the present invention is very accurate and is almost ideal since it closely approximates a theoretically perfect mechanism as will be apparent from a study of the mathematical proof in said Patent No. 2,848,247.

It was pointed out in said patent that the swiveled wheels would be properly positioned for a turn if they were swung from their straight-ahead positions through angles A and B which differed by an amount equal to $2\phi$, where $\phi$ is an angle whose tangent is equal to a constant times the versine of the angle $(A+B)$.

It will be noted that the chains 73 and 74 constrain movement of the small sprocket wheel 159 whereby its center C moves at all times in a straight line perpendicular to and across the line of centers of the main sprocket wheels 153 and 154 and that the link 160 constrains movement of said small wheel whereby the point P moves at all times in an arcuate path generally in the direction of said line of centers. When the small sprocket 159 is turned through an angle $2\theta$ from the straight-ahead position shown in Fig. 3, the center C is moved a distance approximately equal to $e$ times the versine of $2\theta$, where $e$ is the distance between points C and P as indicated in Fig. 5.

It will, therefore, be seen that a very close approximation to a theoretically correct steering action may be obtained by properly selecting the eccentricity $e$ and the size of the small sprocket wheel 159.

The eccentricity for most trucks when employing the steering mechanism of the present invention should be about 0.1 to 1.0 inches when the distance between the large sprocket wheels 153 and 154 is 3 to 6 feet and the distance between the front and rear wheels is 5 to 15 feet. It is seen that the chains eliminate the need for unusually large gears in a steering mechanism for a wide truck. In the wider trucks it is preferable to use double chains to reduce vertical sagging of the chains, but single chains usually are satisfactory.

It will be noted that the truck 101 is identical to the truck 1 shown in said Patent No. 2,848,247, except for the sprocket wheels 153, 154, and 159, the chains 73 and 74, the link 160, the gear segment 75, and the slight modifications of the wheel-supporting turrets 120 and 121 necessary to receive the new elements. Most of the description in said copending application is, therefore, applicable also to the drawings of the present application.

The chain-type steering mechanism of the present invention has distinct advantages over the gear-type mechanism shown in said copending application. The use of chains not only reduces the size of the circular toothed elements but also permits the use of the same circular elements on different size trucks. The manufacturer therefore can make any size truck and can obtain the benefits of mass production as to the sprocket wheels.

The term "versine" is used herein in its normal sense to define the versed sine of an angle which is the difference between unity and the cosine of the angle. Thus, versine $2\theta = 1 - \cos 2\theta$.

It will be understood that the above description is by way of illustration rather than limitation and that, in accordance with the provisions of the patent statutes, variations and modifications of the specific devices disclosed herein may be made without departing from the spirit of the invention.

Having described my invention, I claim:

A steering mechanism for a vehicle having spaced swiveled wheels comprising two main sprocket wheels of substantially the same diameter, a pair of coaxial smaller sprocket wheels between said main sprocket wheels and connected to each other for rotation in unison, a first chain extending around one of said smaller sprocket wheels and one of said main sprocket wheels and providing means to transmit turning movement between said last-named sprocket wheels, a second chain extending around the other of said smaller sprocket wheels and the other of said main sprocket wheels and providing means to transmit turning movement between said last-mentioned sprocket wheels, and means for imparting a substantially harmonic motion to the axis of said smaller sprocket wheels generally along a linear path perpendicular to the line of centers of said main sprocket wheels upon turning movement thereof in either direction, said last-named means comprising a rigid link pivotally connected at one end to a fixed member and pivotally connected at its opposite end to said smaller wheels at a point spaced radially from the center of one of said smaller wheels, whereby such point is constrained to move generally in the direction of the line of centers of said main wheels upon turning of said sprocket wheels.

References Cited in the file of this patent

UNITED STATES PATENTS

| | | |
|---|---|---|
| 239,432 | Bollee | Mar. 29, 1881 |
| 1,382,909 | Hennessy et al. | June 28, 1921 |
| 2,228,247 | Cunningham | Jan. 14, 1941 |
| 2,564,002 | Gibson | Aug. 4, 1951 |
| 2,713,918 | Franheim | July 26, 1955 |
| 2,715,534 | Hoge et al. | Aug. 16, 1955 |
| 2,848,247 | Schreck | Aug. 19, 1958 |

FOREIGN PATENTS

| | | |
|---|---|---|
| 730,558 | Germany | Jan. 14, 1943 |